Figure 1:
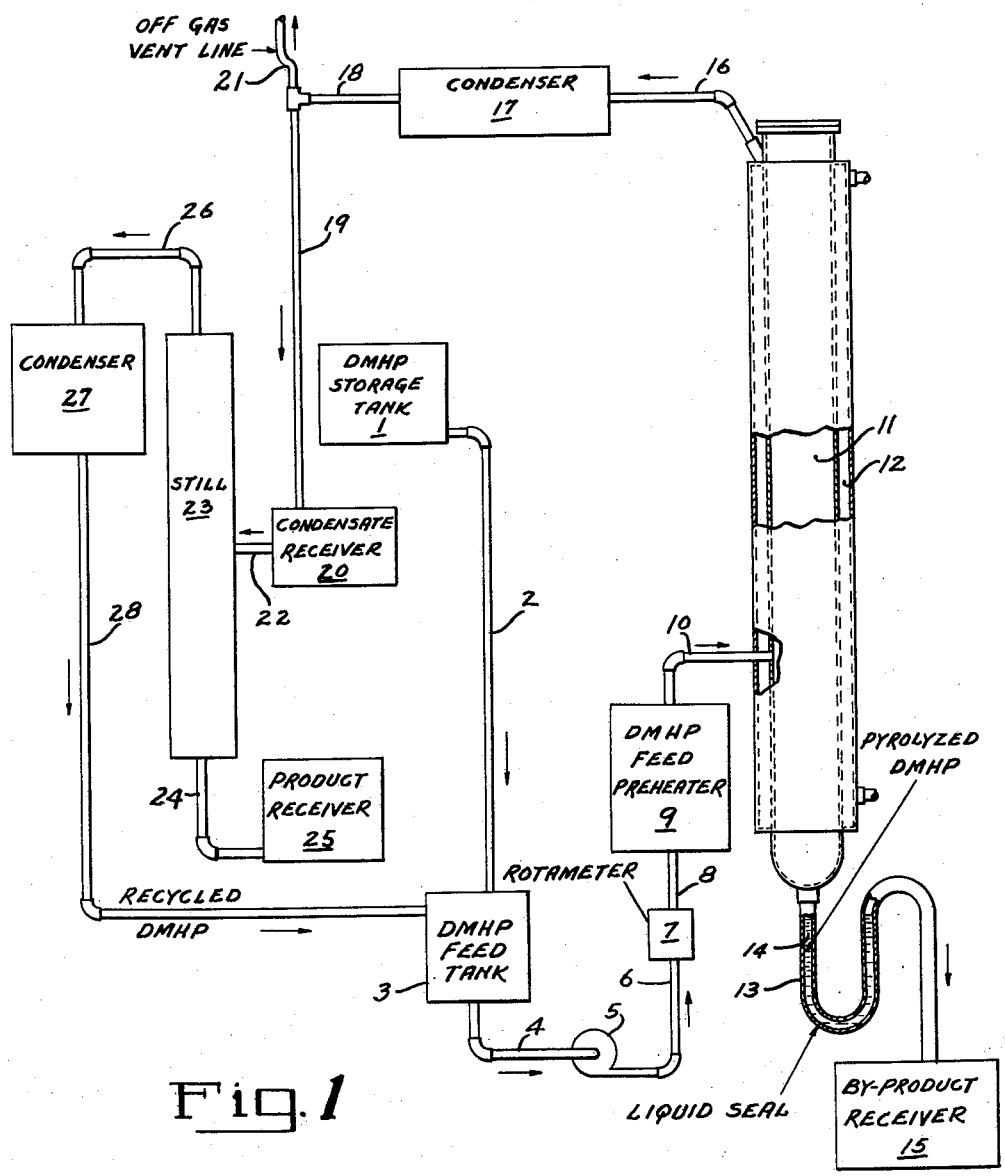

INVENTORS
THOMAS H. CLEVELAND
DAVID H. CHADWICK
EDGAR E. HARDY
BY Elmer P. Rucker
ATTORNEY

3,089,889
PYROLYSIS PRODUCTS OF DIMETHYL HYDROGEN PHOSPHITE AND METHOD OF PRODUCING SAME

Thomas H. Cleveland, David H. Chadwick, and Edgar E. Hardy, Anniston, Ala., assignors to Monsanto Chemical Company, St. Louis, Mo., a corporation of Delaware
Filed July 3, 1950, Ser. No. 172,388
6 Claims. (Cl. 260—461)

The present invention relates to the products obtained by the pyrolysis of dimethyl hydrogen phosphite and to a novel method of making same.

An object of the invention is to provide an economically and commercially feasible method of producing pyrolysis products of dimethyl hydrogen phosphite.

Another object of the invention is to provide a method of producing pyrolysis products of dimethyl hydrogen phosphite with a higher overall content of organic compounds having a carbon to phosphorus bond than is obtainable by prior methods.

Another object of the invention is to provide a commercially practical method of producing dimethyl methane phosphonate.

A further object is to provide a continuous vapor phase method of producing the above products.

Other objects and advantages will be apparent to those skilled in the art as the description of the invention proceeds.

The pyrolysis products of dimethyl hydrogen phosphite are useful as intermediates in the production of insecticides, methyldichlorophosphine oxide, methyldifluorophosphine oxide and warfare chemicals. Heretofore, they have been produced in a liquid phase reaction by heating the above compound to a temperature within the range of 200° C. to 300° C. and preferably within the range of about 235° C. to 265° C.

The composition of the above pyrolysis products is quite complex and their utility in the above applications is dependent upon their available phosphorus content as distinguished from their trivalent and hydrolyzable phosphorus contents.

The "available phosphorus" is determined by analyzing the crude products for their total, trivalent and hydrolyzable contents and substituting them in the following equation:

Available phosphorus $$= \frac{\text{Total } P - (\text{Trivalent } P + \text{Hydrolyzable } P) \times 100}{\text{Total } P}$$

The available phosphorus designates that portion of the reaction products corresponding to the organic compounds having a carbon to phosphorus bond and also that part of the total phosphorus content which is available for use as an intermediate in the production of the above products.

As the expression indicates, the total phosphorus content is the total percentage by weight of phosphorus without regard to the form in which the corresponding compound exists in the complex pyrolysis mixture. The trivalent phosphorus is a measure of unreacted dimethyl hydrogen phosphite in the reaction product. The hydrolyzable phosphorus is that portion of the total phosphorus content corresponding to pyrophosphoric acid and its esters, which may be hydrolyzed in the presence of boiling hydrochloric acid to phosphoric acid and then quantitatively precipitated with molybdate.

In application Serial Number 142,737, filed February 7, 1950, in the name of Edgar E. Hardy, which application is assigned to the same assignee as the present invention, there is disclosed and claimed a method of producing pyrolysis products, which comprises continuously feeding dimethyl hydrogen phosphite into a reaction zone containing a cyclically circulating stream of pyrolyzed dimethyl hydrogen phosphite, heating said stream to a temperature of about 200° C. to about 300° C. to effect pyrolysis of the incoming feed and continuously withdrawing the resulting liquid pyrolysis product at a rate so correlated with the dimethyl hydrogen phosphite feed as to maintain the reaction volume substantially constant. In the practice of the above method, two products are obtained, namely, a relatively small amount of a gaseous byproduct containing unreacted dimethyl hydrogen phosphite, dimethyl methane phosphonate, dimethyl ether, phosphine and inert gases and a relatively large amount of a series of liquid products which fall within the following specifications depending upon reaction conditions.

| | Percent by weight |
|---|---|
| Total phosphorus content | 32–35 |
| Trivalent phosphorus content | 0–0.65 |
| Hydrolyzable phosphorus content | 4.1–7.0 |
| Available phosphorus content | 76.2–88.5 |
| Viscosity in centistokes at 125° C | 52.0–101 |

The gaseous product, on cooling, yields a condensation product consisting essentially of unreacted dimethyl hydrogen phosphite and dimethyl methane phosphonate and a gaseous residue including phosphine, dimethyl ether, methyl alcohol and inert gases, which is exhausted to a burning flare.

The dimethyl methane phosphonate content of the condensed pyrolysis product and the available phosphorus content of the liquid pyrolysis products represent that portion of total reaction product which is available for use as an intermediate in the production of methyldichlorophosphine oxide, methyldifluorophosphine oxide and related products. In contrast thereto, the trivalent and hydrolyzable phosphorus contents represent phosphorus compounds which are not available for the above use. Thus, it can be seen that a substantial amount of phosphorus is lost in the formation of useless biproducts and that the avoidance or minimization of this result is highly desirable.

It is, therefore, the primary object of the instant invention to provide a method of achieving the foregoing objective and thereby substantially increasing the overall yield of available phosphorus over that obtainable by the method disclosed and claimed in the above application. As indicated earlier herein, it is also an object of the invention to provide an economically and commercially feasible method of continuously producing dimethyl methane phosphonate.

To the accomplishment of the foregoing and related ends, the invention comprises the features hereinafter disclosed and particularly pointed out in the claims and the following description sets forth in detail one of the various forms in which the principle of the invention may be applied.

In accordance with the instant invention, dimethyl hydrogen phosphite (DMHP) is subjected to pyrolysis by heating same in the vapor phase to a temperature in the range of about 200° C. to 400° C. to form, as a principal product, a vaporized mixture containing dimethyl methane phosphonate, unreacted dimethyl hydrogen phosphite, dimethyl ether, methyl alcohol and phosphine and, as a byproduct, a complex pyrolysis product which is condensed and collected at the bottom of the reactor.

The vaporized product is cooled to condense a crude liquid mixture consisting essentially of dimethyl methane phosphonate and unreacted dimethyl hydrogen phosphite, the uncondensed gases being exhausted to a burning flare.

The liquid condensate is then distilled to vaporize the unreacted material, leaving substantially pure dimethyl methane phosphonate as a residue.

The products of the above pyrolysis reaction are both suitable for the uses mentioned in the above application. Moreover, the overall yield of available phosphorus from these two products is higher than that obtainable by the method of the above application since the pyrolysis reaction has been shifted in the direction of greatly increased yields of dimethyl methane phosphonate. Furthermore, the shifting of the reaction in this direction provides an additional advantage in that the principal product may be chlorinated more readily and by a greater number of chlorinating agents than the principal product of the method of the above application.

The following equations are believed to represent the reactions which take place during the vapor phase pyrolysis of dimethyl hydrogen phosphite:

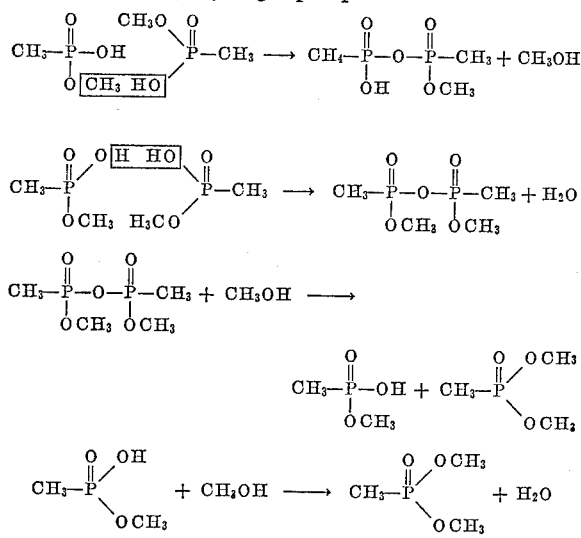

However, it is to be understood that in view of the complexity of the reactions involved, applicants are not bound by the above disclosure, since it may ultimately turn out that the reactions resulting in the formation of dimethyl methane phosphonate are quite different.

For a more complete understanding of the present invention, reference is made to the accompanying drawing which shows in conventional side elevation one particular embodiment of the invention. However, it should be understood that modifications and variations in the equipment apparent to those skilled in the art may be made as desired without departing from the spirit of the invention.

Referring to the drawing, reference character 1 represents a storage tank for dimethyl hydrogen phosphite, the reactant employed in the manufacture of the pyrolysis products of the instant invention. The dimethyl hydrogen phosphite is conducted by line 2 to a feed tank 3, from which it is withdrawn by line 4 and forced by pump 5 through line 6, rotameter 7 and line 8 into preheater 9. In the preheater 9, the above reactant is heated to its boiling point and then conveyed as a vapor by line 10 into a tower reactor 11.

The tower reactor 11 consists of a simple glass or Hastelloy tube of any convenient diameter which may or may not be filled with packing such as rings made of the foregoing materials. The reactor is provided with a jacket 12, through which a heat exchanging fluid is passed in order to heat the dimethyl hydrogen phosphite up to reaction temperature, that is, to a temperature in the range of 200° C. to 400° C.

The bottom of the reactor 11 is equipped with a Z-shaped tube 13 filled with a liquid 14 which serves as a liquid seal. This liquid consists of liquid pyrolyzed dimethyl hydrogen phosphite—the byproduct of the method of the instant invention. The open end of the tube 13 permits the liquid byproduct to flow continuously into a receiver 15 as rapidly as it is formed.

The top of the reactor 11 is provided with a take-off line 16 for conveying the vaporized reaction product to a condenser 17 which is cooled by water or another suitable cooling medium. In the condenser, the vaporized reaction product is separated into a crude liquid product containing dimethyl methane phosphonate and unreacted dimethyl hydrogen phosphite and a gaseous product including phosphine, methyl alcohol and methyl ether. The liquid product is discharged from the condenser by line 18 and then led into a condensate receiver 20 by line 19. The gaseous product is conveyed from the condenser by line 18 and exhausted to a burning flare (not shown) by off-gas vent line 21 or it may be conducted to a suitable system (not shown) for treatment to render same innocuous.

The condensate is withdrawn from receiver 20 by line 22 and introduced into a continuous still 23 where the unreacted dimethyl hydrogen phosphite is removed by distillation at a temperature of about 56° to 80° C. while under an absolute pressure of from about 11 to 25 of Hg, thus leaving a residue of substantially pure dimethyl methane phosphonate which is drawn off by line 24 into a suitable receiver 25. If a product of higher purity is desired, the residue may be subjected to a further distillation to recover a distillate corresponding to practically 100% dimethyl methane phosphonate.

The unreacted dimethyl hydrogen phosphite is conducted by line 26 to a condenser 27 where it is condensed and then recycled by line 28 to the feed tank 3. The recycled dimethyl hydrogen phosphite is mixed with fresh reactant in the above feed tank and then returned to the reactor for further conversion to dimethyl methane phosphonate and liquid pyrolysis products in the manner hereinbefore described.

In the practice of the invention in the above system, dimethyl hydrogen phosphite is preheated to its boiling point and continuously introduced as a vapor into the reactor which is maintained at a temperature within the range of 200° C. to 400° C. Upon entering the reactor, the above compound is continuously pyrolyzed to form a vaporous mixture including dimethyl methane phosphonate, dimethyl ether, methyl alcohol, phosphine and unreacted dimethyl hydrogen phosphite. In addition, a complex pyrolysis byproduct is continuously produced and collected as condensate in the bottom of the reactor, from which it flows continuously into the byproduct receiver.

The vaporous mixture is continuously conducted to the condenser where a crude mixture of dimethyl methane phosphonate and unreacted dimethyl hydrogen phosphite is continuously separated by condensation.

The condensate is continuously introduced into a still wherein it is heated to a temperature of about 56° C. to about 80° C. while under a pressure of about 11 to 25 mm. of mercury. In this operation the unreacted dimethyl hydrogen phosphite is continuously separated from the dimethyl methane phosphonate by fractional distillation, the latter compound being continuously withdrawn in a substantially pure form into the product receiver. Upon redistillation, dimethyl methane phosphonate of the following purity is obtained:

|  | Found, percent by weight | Theory for Dimethyl Methane Phosphonate, percent by weight |
|---|---|---|
| Total P | 24.56 | 24.97 |

The dimethyl hydrogen phosphite separated by distillation is continuously condensed and after mixing with fresh feed is continuously recycled to the reactor to produce additional amounts of dimethyl methane phosphonate and a complex liquid pyrolysis byproduct principally containing organic phosphorus compounds having a carbon to phosphorus bond together with minor amounts of organic phosphorus compounds containing trivalent and hydrolyzable phosphorus.

The pyrolysis reaction is carried out at a temperature within the range of 200° C. to 400° C., but it is preferred in practice to operate at a temperature within the range of 235° C. to 265° C.

There is nothing critical about the type or construction of the reactor so long as the reaction is carried out in the vapor phase and at a temperature within the above limits. Moreover, it is not necessary to vaporize the dimethyl hydrogen phosphite outside the reactor as it is within the scope of the invention to adjust the temperature and pressure conditions so as to achieve substantially instantaneous vaporization of the above compound as soon as it enters the reactor.

Variations in the conditions under which the present method is operated, depending upon the nature and size of the equipment and the other factors involved, are contemplated as being within the scope of the present invention and the invention is not to be construed as being limited to the specific conditions or apparatus described herein except as defined in the appended claims.

What we claim is:

1. The method which comprises vaporizing dimethyl hydrogen phosphite and heating the resulting vapor to a temperature of about 200° C. to about 400° C.

2. The method which comprises vaporizing dimethyl hydrogen phosphite and heating the resulting vapor to a temperature of about 235° C. to about 265° C.

3. The method of producing dimethyl methane phosphonate, which comprises vaporizing dimethyl hydrogen phosphite and heating the resulting vapor to a temperature of about 200° C. to about 400° C. to form a vaporous mixture containing dimethyl methane phosphonate, cooling said mixture to condense a crude product containing said phosphonate, and then recovering said phosphonate by fractional distillation.

4. The method of producing dimethyl methane phosphonate, which comprises vaporizing dimethyl hydrogen phosphite and heating the resulting vapor to a temperature of about 235° C. to about 265° C. to form a vaporous mixture containing dimethyl methane phosphonate, cooling said mixture to condense a crude product containing said phosphonate, and then recovering said phosphonate by fractional distillation.

5. The method which comprises introducing vaporized dimethyl hydrogen phosphite into a reaction zone, continuously heating said vapor to a temperature of about 200° C. to about 400° C. to continuously produce a vaporous mixture and as a byproduct a complex liquid pyrolysis product, continuously cooling said vaporous mixture to continuously condense a crude liquid product containing dimethyl methane phosphonate and unreacted dimethyl hydrogen phosphite, continuously introducing said condensate into a still to separate said unreacted dimethyl hydrogen phosphite from said phosphonate by fractional distillation, condensing and continuously recycling said unreacted dimethyl hydrogen phosphite to said reaction zone for conversion to further quantities of dimethyl methane phosphonate and complex liquid pyrolysis byproduct.

6. The method which comprises introducing vaporized dimethyl hydrogen phosphite into a reaction zone, continuously heating said vapor to a temperature of about 235° C. to about 265° C. to continuously produce a vaporous mixture and as a byproduct a complex liquid pyrolysis product, continuously cooling said vaporous mixture to continuously condense a crude liquid product containing dimethyl methane phosphonate and unreacted dimethyl hydrogen phosphite, continuously introducing said condensate into a still to separate said unreacted dimethyl hydrogen phosphite from said phosphonate by fractional distillation, condensing and continuously recycling said unreacted dimethyl hydrogen phosphite to said reaction zone for conversion to further quantities of dimethyl methane phosphonate and complex liquid pyrolysis byproduct.

References Cited in the file of this patent

UNITED STATES PATENTS

| | | |
|---|---|---|
| 2,863,900 | Beach et al. | Dec. 9, 1958 |
| 2,923,729 | Hardy | Feb. 2, 1960 |

OTHER REFERENCES

Schrader: British Intelligence Objectives Report No. 1808, Item 22, pages 19 and 20, released October 4, 1918.